(12) United States Patent
Gulick et al.

(10) Patent No.: US 6,697,890 B1
(45) Date of Patent: Feb. 24, 2004

(54) I/O NODE FOR A COMPUTER SYSTEM INCLUDING AN INTEGRATED I/O INTERFACE

(75) Inventors: Dale E. Gulick, Austin, TX (US); Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 235 days.

(21) Appl. No.: 10/034,878

(22) Filed: Dec. 27, 2001

(51) Int. Cl.[7] .............................................. G06F 13/12
(52) U.S. Cl. ............................. 710/62; 710/33; 710/36; 710/106; 709/201; 709/230
(58) Field of Search ................................ 710/1, 15, 17, 710/18, 29, 31, 33, 36, 38, 41, 62, 64, 72, 105, 106; 712/29, 225; 709/201, 230

(56) References Cited

U.S. PATENT DOCUMENTS

| | | | |
|---|---|---|---|
| 5,432,907 A | * 7/1995 | Picazo, Jr. et al. | 395/200 |
| 5,490,168 A | * 2/1996 | Phillips et al. | 375/224 |
| 5,812,930 A | * 9/1998 | Zavrel | 455/5.1 |
| 5,859,848 A | * 1/1999 | Miura et al. | 370/395 |
| 6,278,532 B1 | 8/2001 | Heimendinger et al. | |
| 6,282,714 B1 | * 8/2001 | Ghori et al. | 725/81 |
| 6,359,907 B1 | * 3/2002 | Wolters et al. | 370/485 |
| 6,414,525 B2 | 7/2002 | Urakawa | |
| 6,532,283 B1 | * 3/2003 | Ingram | 379/130 |

OTHER PUBLICATIONS

U.S. patent application Ser. No. 09/978,349, filed Oct. 15, 2001.
U.S. patent application Ser. No. 10/093,146, filed Mar. 7, 2002.

* cited by examiner

Primary Examiner—Jeffrey Gaffin
Assistant Examiner—Rijue Mai
(74) Attorney, Agent, or Firm—Meyertons Hood Kivlin Kowert & Goetzel, P.C.; B. Noël Kivlin

(57) ABSTRACT

An I/O node for a computer system including an integrated I/O interface. An input/output node for a computer system that is implemented upon an integrated circuit includes a first transceiver unit, a second transceiver unit, a packet tunnel, a bridge unit and an I/O interface unit. The first transceiver unit may receive and transmit packet transactions on a first link of a packet bus. The second transceiver unit may receive and transmit packet transactions on a second link of the packet bus. The packet tunnel may convey selected packet transactions between the first and second transceiver units. The bridge unit may receive particular packet transactions from the first transceiver may transmit transactions corresponding to the particular packet transactions upon a peripheral bus. The I/O interface unit may receive additional packet transactions from the first transceiver unit and may transmit transactions corresponding to the additional packet transactions upon an I/O link.

20 Claims, 2 Drawing Sheets

I/O NODE FOR A COMPUTER SYSTEM INCLUDING AN INTEGRATED I/O INTERFACE

BACKGROUND OF THE INVENTION

1. Field of the Invention

This invention relates to computer system input/output (I/O) and, more particularly, to I/O nodes including integrated I/O functionality.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. Examples of a shared bus used by I/O devices are a peripheral component interconnect (PCI) bus and an extended peripheral component interconnect (PCI-X) bus.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI-X bus and a graphics bus such as AGP. The PCI-X bus may be connected to a packet bus interface that may then translate PCI-X bus transactions into packet transactions for transmission on a packet bus. Likewise the graphics bus may be connected to an AGP interface that may translate AGP transactions into packet transactions. Each interface may communicate with a host bridge associated with one of the processors or in some cases to another peripheral device.

Since transactions associated with many peripheral buses have ordering rules, many of the packet bus interfaces may have arbitration rules to ensure that the peripheral transactions do not become stalled. I/O devices which use communication protocols such as Ethernet or Infiniband™ may be connected to the system via card slots on buses such as the PCI-X bus and may thus be constrained by the arbitration rules associated with the PCI-X bus. In addition, those I/O devices may have bandwidth requirements that may cause other devices connected to the PCI-X bus to be unintentionally starved or vice versa.

In some systems, the processor connects to the system I/O using one or more integrated circuit chips that may be part of a chipset. In some cases, an I/O node may be manufactured on an integrated circuit chip that may be dedicated to one type of peripheral bus, such as the PCI-X bus. Thus, if an I/O device as described above were connected to the I/O node through such peripheral bus, there may be undesirable results.

SUMMARY OF THE INVENTION

Various embodiments of an I/O node including an integrated I/O interface are disclosed. In one embodiment, an input/output node for a computer system that is implemented on an integrated circuit chip includes a first transceiver unit, a second transceiver unit, a packet tunnel, a bridge unit and an I/O interface unit.

The first transceiver unit may be configured to receive and transmit packet transactions on a first link of a packet bus. The second transceiver unit may be coupled to receive and transmit packet transactions on a second link of the packet bus. The packet tunnel is coupled to convey selected packet transactions between the first transceiver unit and the second transceiver unit. The bridge unit is coupled to receive particular packet transactions from the first transceiver and may be configured to transmit transactions corresponding to the particular packet transactions upon a peripheral bus, such as for example, a PCI-X bus. The I/O interface unit is coupled to receive additional packet transactions from the first transceiver and may be configured to transmit transactions corresponding to the additional packet transactions upon an I/O link, such as an Ethernet link, for example.

In one particular implementation, the I/O node may further include a control unit coupled to control the conveyance of the selected packet transactions, the particular packet transactions and the additional packet transactions between the first transceiver and the second transceiver, between the first transceiver and the bridge unit and between the first transceiver and the I/O interface unit, respectively.

In one particular implementation, the I/O interface unit may be further configured to receive I/O transactions on the I/O link and to transmit transactions corresponding to the I/O transactions to the first transceiver unit.

In another implementation, the bridge unit may be further configured to receive peripheral transactions from the peripheral bus and to transmit transactions corresponding to the peripheral transactions to the first transceiver unit.

In yet another implementation, the control unit may be further configured to establish an arbitration priority

Figure 1:
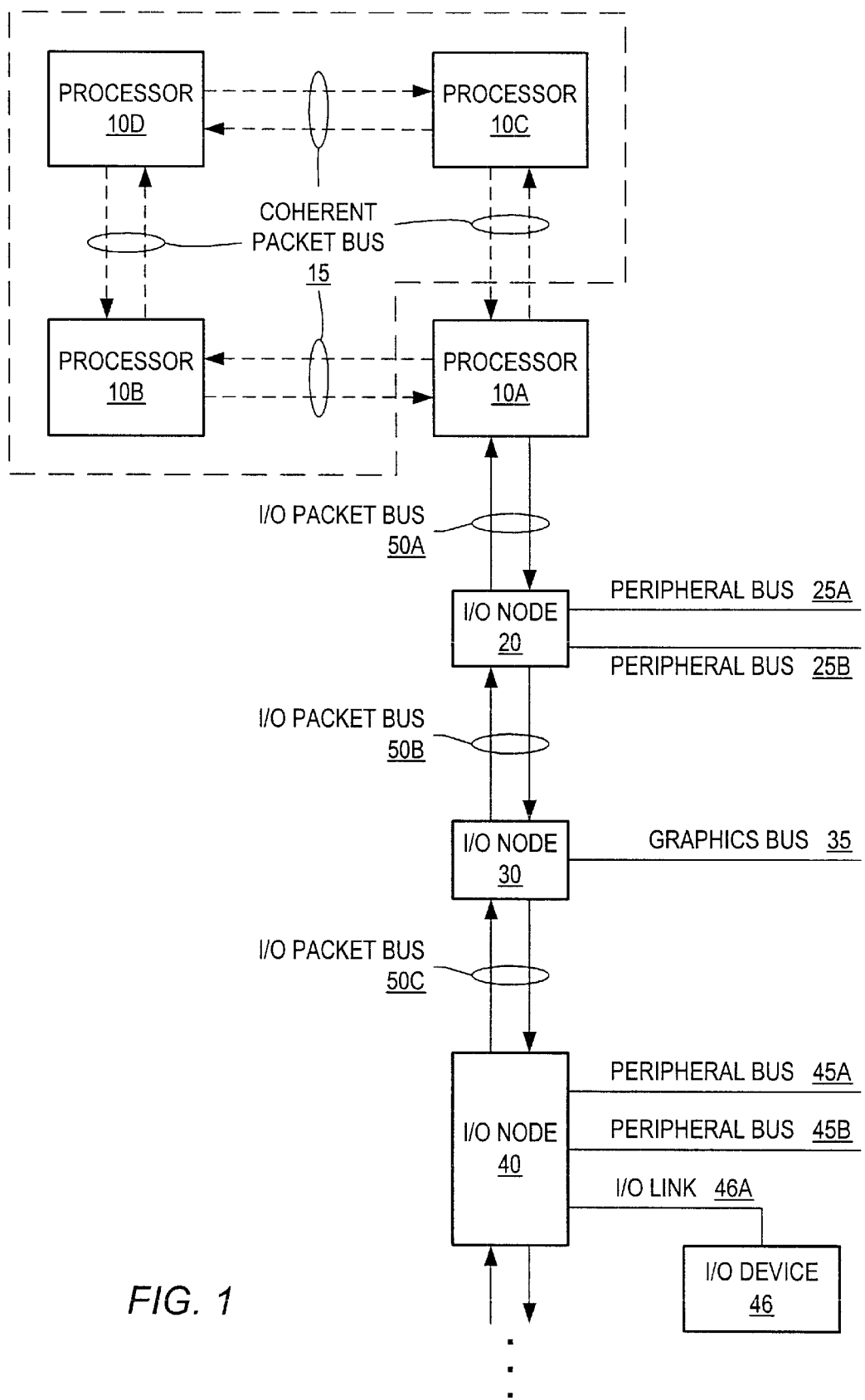
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge (not shown) for communicating with I/O nodes 20, 30 and 40 via I/O packet bus 50A–C. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35. I/O node 40 is connected to another pair of peripheral buses 45A and 45B and to an I/O device 46 through an I/O link 46A.

Processors 10A–10D are each illustrative of, for example, an x86 microprocessor such as an Athlon™ microprocessor. One example of a point-to-point packet bus such as I/O packet bus 50A–50C may be a non-coherent HyperTransport™. Peripheral buses 25A–B and peripheral buses 45A–B are illustrative of a common peripheral bus such as a peripheral component interconnect (PCI) bus or an extended peripheral component interconnect (PCI-X) bus. Graphics bus 35 is illustrative of an accelerated graphics port (AGP) bus, for example. It is understood, however, that other types of microprocessors and other types of peripheral buses may be used. I/O device 46 is an example of any type of peripheral device which may communicate with I/O node 40 via I/O link 46A using an I/O protocol such as Ethernet, Infiniband™ or Fibre channel, for example.

It is noted that while three I/O nodes are shown connected to host processor 10A, other embodiments may have other numbers of nodes and those nodes may be connected in other topologies. It is understood that the chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, an I/O node such as I/O node 40 may translate transactions such as PCI-X bus transactions into upstream packet transactions that travel in I/O streams. I/O node 40 may additionally translate downstream packet transactions into PCI-X bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device (not shown) on peripheral bus 45B initiates a transaction directed to a peripheral device (not shown) on peripheral bus 25A. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25A from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25A. I/O node 20 may then translate the packets into peripheral bus transactions and transmit the transactions to the peripheral device on peripheral bus 25A.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular i/O node and is inserted into the upstream traffic is referred to as "injected" traffic.

As will be described in greater detail below, in addition to I/O node 40 providing peripheral interfaces for such peripheral buses as peripheral buses 45A–B, I/O node 40 may also include an integrated I/O interface for devices which may otherwise be connected to a peripheral bus such as peripheral buses 45A or 45B. For example, I/O node 40 may include an integrated redundant array of inexpensive disks (RAID) controller and I/O device 46 may be a storage unit that includes multiple hard disk drives. As another example, I/O node 40 may include an integrated Ethernet controller and I/O device 46 may be a node of a different computer network. Depending on the bandwidth requirements of the integrated I/O interface and the type of I/O device 46 that may be connected to I/O node 40, I/O node 40 may selectively control the traffic flow injected into the upstream traffic of the computer system.

Figure 2:
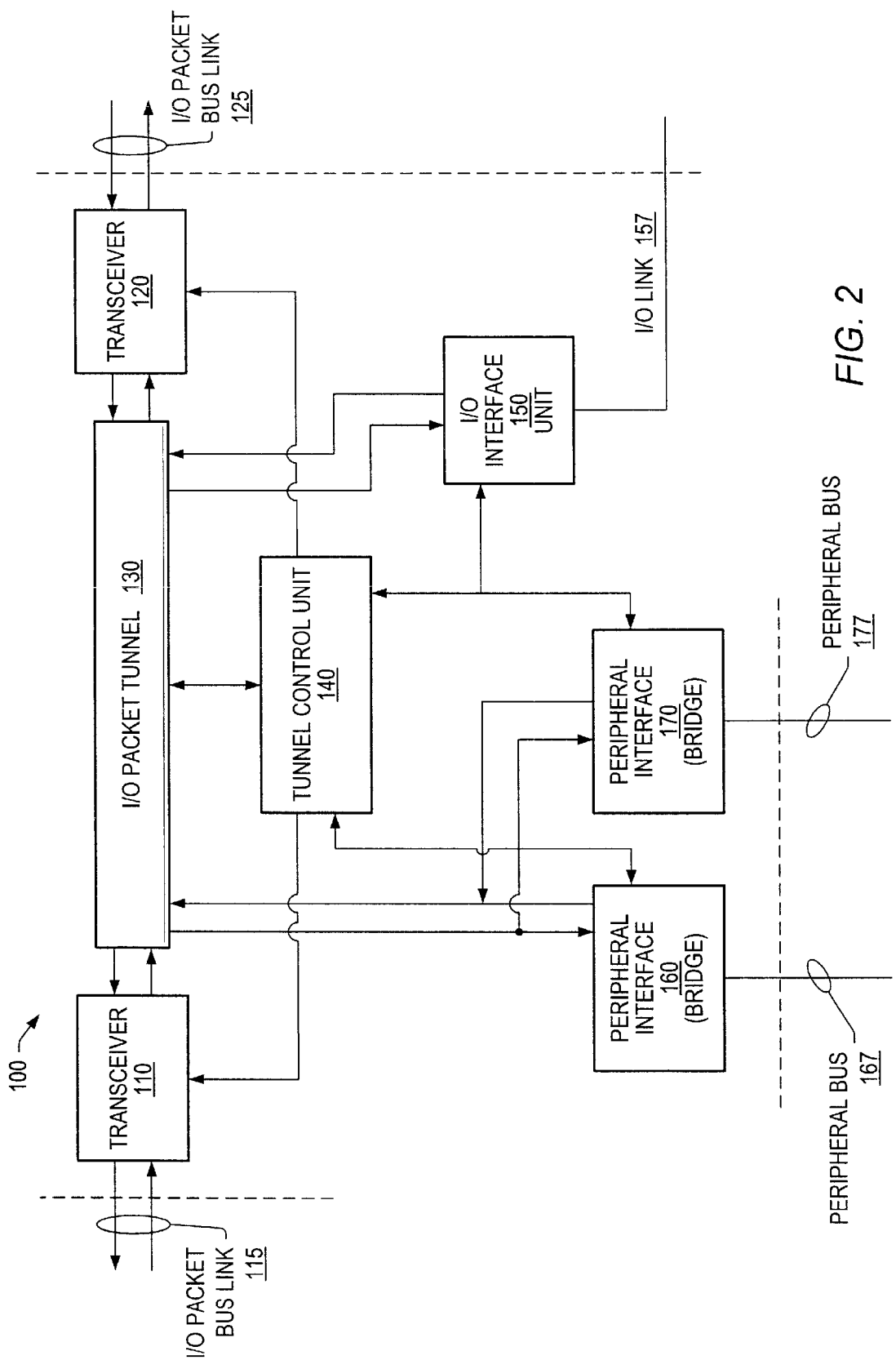
FIG. 2 is a block diagram of one embodiment of an I/O node including an integrated I/O interface.

Referring to FIG. 2, a block diagram of one embodiment of an I/O node is shown. I/O node 100 includes a transceiver unit 110 which is coupled to a link of an I/O packet bus 115 and a transceiver unit 120 which is coupled to another I/O packet bus link 125. I/O node 100 also includes an I/O packet tunnel 130 which is coupled between transceivers 110 and 120. I/O node 100 further includes an I/O interface unit 150, a peripheral interface unit 160 and a peripheral interface 170 which are also coupled to receive transactions from transceiver unit 110 through I/O packet tunnel 130. In addition, tunnel control unit 140 is coupled to control the conveyance of transactions through I/O node 100. I/O interface unit 150 is coupled to an I/O link 157, while peripheral interface unit 160 and peripheral interface 170 are coupled to peripheral buses 167 and 177, respectively.

Transceivers 110 and 120 may be configured to transmit and receive packet transactions over I/O packet bus links 115 and 125, respectively. Transceivers 110 and 120 may include buffers and control logic (not shown) necessary to buffer incoming and outgoing packets. Transceivers 110 and 120 may also each include I/O packet tunnel interface logic (not shown) for transmitting and receiving packet transactions within I/O node 100. In addition, transceivers 110 and 120 may also be configured to provide control commands for use by tunnel control unit 140.

I/O packet tunnel 130 may include a collection of internal packet bus structures (not shown) used to convey packet transactions internal to I/O node 100. The internal packet bus structures may include command, data and control buses used to convey packets between transceivers 110 and 120 and between each of peripheral interfaces 160 and 170 and transceiver 110 also between I/O interface 150 and transceiver 110.

Tunnel control unit 140 may include logic (not shown) for controlling the conveyance of packets between interfaces as described above. The logic may include arbitration, fairness and buffering circuits (not shown) that may be used to determine the injected transaction flow rate.

Each of peripheral interfaces 160 and 170 may be used to translate transactions between the I/O packet tunnel and a peripheral bus protocol such as a PCI-X protocol, for example. As mentioned above, peripheral interfaces 160 and 170 may translate bus cycles received from peripheral buses 167 and 177 into packet transactions for transmission on I/O packet bus link 115. In addition, peripheral interfaces 160 and 170 may translate packet transactions into bus cycles suitable for transmission upon peripheral buses 167 and 177. Peripheral interfaces 160 and 170 may also include arbitration and buffering logic (not shown) for scheduling peripheral bus transactions.

I/O interface unit 150 may also translate packet transactions into an I/O protocol suitable for use by I/O interface unit 150. Additionally, I/O interface unit 150 may translate transactions from an I/O protocol suitable for use by I/O interface unit 150 into packet transactions for transmission on I/O packet bus link 115. As will be described in greater detail below, I/O interface unit 150 may also include circuitry which implements a particular I/O device such as a Gigabit Ethernet™ controller or an Infiniband™ port controller, for example.

In one embodiment, I/O node 100 may be connected into a computer system such as the computer system of FIG. 1 such that processor 10A may be connected to I/O packet bus 115 of FIG. 2 and I/O packet bus 125 may be connected to another I/O node. In such an embodiment, transactions that are injected into the packet flow by I/O node 100 may only be directed upstream. Thus, packet transactions received by transceiver 120 may be forwarded upstream through I/O packet bus tunnel 130 to transceiver 110. Conversely, downstream packet transactions received by transceiver 110 may be forwarded to transceiver 120 though I/O packet bus tunnel 130 and transmitted downstream. In addition, downstream packet transactions received by transceiver 110 may be claimed by I/O node 100 and forwarded to either I/O interface unit 150 or peripheral interfaces 160 or 170. In the case of a downstream broadcast transaction received by transceiver 110, the broadcast packet transaction may be both forwarded downstream and claimed by I/O node 100. However, transactions that originate at I/O node 100 (e.g. PCI-X transactions from peripheral bus 167 or Ethernet transactions received from I/O link 157) may be injected into I/O packet tunnel 130 and transmitted upstream by transceiver 110. It is contemplated that in other embodiments, the connections to transceivers 110 and 120 may be interchanged such that in the above example transceiver 110 may be connected to a downstream node and transceiver 120 may be connected to a processor such as processor 10A of FIG. 1

Tunnel control unit 140 of FIG. 2 may control the rate of injection of transactions being sent upstream by I/O node 100. Since tunnel control unit 140 may not have a priori knowledge of the devices connected to peripheral bus 167, tunnel control unit 140 may be configured to give nearly equal bandwidth to the peripheral buses on that node. If a given I/O interface unit which is embodied in a peripheral device (not shown) connected to peripheral bus 167, requires a special bandwidth allocation, then tunnel control unit 140 may not be capable of providing the necessary bandwidth to the given I/O interface unit. This may be particularly true when multiple devices are connected to peripheral bus 167 since the total bandwidth may be divided between the devices.

Many integrated circuit chips that are I/O intensive may have die area available for additional circuitry. This may be due to the die having many external connections that are commonly referred to as pads. The number of pads may be determined or limited by the actual size of the integrated circuit. In such a case, the die may be referred to as being 'pad limited' and may result in 'white space' or area on the surface of the chip that contains no circuitry. Thus, since the integrated circuit die size may already be determined, it may be beneficial to fill the white space with additional circuitry, particularly when the additional circuitry adds functionality with few additional I/O pads or significant area.

Thus, by integrating a particular I/O interface unit such as I/O interface unit 150 into the integrated circuit chip of an I/O node, additional I/O functionality may be added to the I/O node integrated circuit chip. Since tunnel control unit 140 may now have knowledge of the particular bandwidth requirements of the I/O interface unit, tunnel control unit 140 may thus be configured with a predetermined fairness policy which may accommodate the particular I/O interface unit. In addition, I/O interface unit 150 may be coupled to packet bus 115 and 125 through packet bus tunnel 130 without additional scheduling and arbitration stages which may be associated with a peripheral interface such as peripheral interfaces 160 and 170. Thus, there may be a decrease in the latency of transactions between I/O interface unit 150 and an upstream device such as processor 10A of FIG. 1.

It is noted that in the above embodiments I/O interface unit 150 is described as a general purpose I/O interface. However, it is contemplated that in another specific embodiment, I/O interface unit 150 may be a controller and may contain circuitry configured to implement a protocol such as an Ethernet protocol. In such an embodiment, I/O link 157 may be an Ethernet link. For example, I/O node 100 may be connected to another Ethernet compatible device via I/O link 157. The other device may be another computer or node within the same or different network. The Ethernet protocol is described in IEEE standard 802.3.

In another embodiment, I/O interface 50 may be a controller and may contain circuitry configured to implement a protocol such as an Infiniband™ protocol. In such an embodiment, I/O link 157 may be an Infiniband™ link. For example, I/O node 100 may be connected to another Infiniband™ compatible device via I/O link 157. The other device may be another computer or node within the same or different network fabric that also contains an Infiniband™ controller. The Infiniband™ protocol is described in the most current release of the Infiniband™ Architecture Specification. In yet another embodiment, I/O interface unit 150 may be a RAID controller connected via I/O link 157 to a plurality of storage units. Further still, it is contemplated in another embodiment, I/O interface unit 150 may be a Fibre Channel controller and I/O link 157 may be an optical link.

It is noted that although the illustrated embodiment shows a single I/O interface unit within I/O node 100, it is contemplated that other embodiments may include other numbers of I/O interface units. In addition it is contemplated that other embodiments may include other numbers of peripheral interfaces and peripheral buses.

Numerous variations and modifications will become apparent to those skilled in the art once the above disclosure is fully appreciated. It is intended that the following claims be interpreted to embrace all such variations and modifications.

What is claimed is:

1. An input/output node for a computer system, said input/output node comprising:
   a first transceiver unit implemented on an integrated circuit chip, wherein said first transceiver unit is configured to receive and transmit packet transactions on a first link of a packet bus;
   a second transceiver unit implemented on said integrated circuit chip, wherein said second transceiver unit is coupled to receive and transmit packet transactions on a second link of said packet bus;
   a packet tunnel implemented on said integrated circuit chip, wherein said packet tunnel is coupled to convey selected packet transactions between said first transceiver unit and said second transceiver unit;
   a bridge unit implemented on said integrated circuit chip, wherein said bridge unit is coupled to receive particular packet transactions from said first transceiver and is configured to transmit transactions corresponding to said particular packet transactions upon a peripheral bus; and
   an I/O interface unit implemented on said integrated circuit chip, wherein said I/O interface unit is coupled to receive additional packet transactions from said first transceiver and is configured to transmit transactions corresponding to said additional packet transactions upon an I/O link.

2. The input/output node as recited in claim 1 further comprising a control unit implemented on said integrated circuit chip, wherein said control unit is coupled to control the conveyance of said selected packet transactions, said particular packet transactions and said additional packet transactions between said first transceiver and said second transceiver, between said first transceiver and said bridge unit and between said first transceiver and said I/O interface unit, respectively.

3. The input/output node as recited in claim 2, wherein said I/O interface unit is further configured to receive I/O transactions on said I/O link and to transmit transactions corresponding to said I/O transactions to said first transceiver unit.

4. The input/output node as recited in claim 3, wherein said bridge unit is further configured to receive peripheral transactions from said peripheral bus and to transmit transactions corresponding to said peripheral transactions to said first transceiver unit.

5. The input/output node as recited in claim 4, wherein said control unit is further configured to establish an arbitration priority between said first and second transceiver units, said I/O interface unit and said bridge unit.

6. The input/output node as recited in claim 5, wherein said I/O interface unit is a redundant array of inexpensive disks (RAID) controller for connection to one or more disk drives through said I/O link.

7. The input/output node as recited in claim 5, wherein said I/O interface unit is an Infiniband™ controller for connection to a network through said I/O link.

8. The input/output node as recited in claim 5, wherein said I/O interface unit is an Ethernet controller for connection to a network through said I/O link.

9. The input/output node as recited in claim 5, wherein said peripheral bus is an extended peripheral component interconnect (PCI-X) bus.

10. The input/output node as recited in claim 5, wherein said packet bus is a HyperTransport™ bus.

11. A computer system comprising:
    a processor;
    a first link of a packet bus coupled to said processor;
    an input/output node coupled to said first link, said input/output node including:
      a first transceiver unit implemented on an integrated circuit chip, wherein said first transceiver unit is configured to receive and transmit packet transactions on said first link of a packet bus;
      a second transceiver unit implemented on said integrated circuit chip, wherein said second transceiver unit is coupled to receive and transmit packet transactions on a second link of said packet bus;
      a packet tunnel implemented on said integrated circuit chip, wherein said packet tunnel is coupled to convey selected packet transactions between said first transceiver unit and said second transceiver unit;
      a bridge unit implemented on said integrated circuit chip, wherein said bridge unit is coupled to receive particular packet transactions from said first transceiver and is configured to transmit transactions corresponding to said particular packet transactions upon a peripheral bus; and
      an I/O interface unit implemented on said integrated circuit chip, wherein said I/O interface unit is coupled to receive additional packet transactions from said first transceiver and is configured to transmit transactions corresponding to said additional packet transactions upon an I/O link.

12. The computer system as recited in claim 11 further comprising a control unit implemented on said integrated circuit chip, wherein said control unit is coupled to control the conveyance of said selected packet transactions, said particular packet transactions and said additional packet transactions between said first transceiver and said second transceiver, between said first transceiver and said bridge unit and between said first transceiver and said I/O interface unit, respectively.

13. The computer system as recited in claim 12, wherein said I/O interface unit is further configured to receive I/O transactions on said I/O link and to transmit transactions corresponding to said I/O transactions to said first transceiver unit.

14. The computer system as recited in claim 13, wherein said bridge unit is further configured to receive peripheral transactions from said peripheral bus and to transmit transactions corresponding to said peripheral transactions to said first transceiver unit.

15. The computer system as recited in claim 14, wherein said control unit is further configured to establish an arbitration priority between said first and second transceiver units, said I/O interface unit and said bridge unit.

16. The computer system as recited in claim 15, wherein said I/O interface unit is a redundant array of inexpensive disks (RAID) controller for connection to one or more disk drives through said I/O link.

17. The computer system as recited in claim 15, wherein said I/O interface unit is an Infiniband™ controller for connection to a network through said I/O link.

18. The computer system as recited in claim 15, wherein said I/O interface unit is an Ethernet controller for connection to a network through said I/O link.

19. The computer system as recited in claim 15, wherein said peripheral bus is an extended peripheral component interconnect (PCI-X) bus.

20. The computer system as recited in claim 15, wherein said packet bus is a HyperTransport™ bus.

* * * * *